United States Patent [19]

Lake, Jr.

[11] 4,235,263
[45] Nov. 25, 1980

[54] VAPOR RECOVERY FUEL TANK FILLER SYSTEM

[75] Inventor: Leo C. Lake, Jr., Mission Viejo, Calif.

[73] Assignee: Yamaha Motor Corporation, Buena Park, Calif.

[21] Appl. No.: 23,703

[22] Filed: Mar. 26, 1979

[51] Int. Cl.³ .............................................. B65B 3/26
[52] U.S. Cl. ........................................ 141/1; 141/285; 141/311 R; 220/86 R
[58] Field of Search .................... 137/587, 588; 141/1, 141/97, 285, 286, 288, 291, 310, 311 R, 325, 351–353, 374, 392; 220/86 R

[56] References Cited

U.S. PATENT DOCUMENTS

| | | | |
|---|---|---|---|
| 2,503,031 | 4/1950 | Davidson | 220/86 R X |
| 2,576,192 | 11/1951 | Poznik | 220/86 R |
| 3,334,779 | 8/1967 | Smith | 220/86 R |
| 3,903,942 | 9/1975 | Vest | 220/86 R X |

Primary Examiner—Frederick R. Schmidt
Attorney, Agent, or Firm—Freilich, Hornbaker, Wasserman, Rosen & Fernandez

[57] ABSTRACT

A filler device which can be mounted in the fuel tank of a motorcycle to enable complete filling of the tank, when a fuel dispenser is utilized which has a vapor recovery seal that must be pressed against the outside of the tank so that the fuel nozzle must project several inches into the tank. The filler device includes walls forming a chamber with an open upper end for receiving the fuel-dispensing nozzle, an open lower end for flowing the fuel into the tank, and a seal assembly which can seal to the end of the nozzle to prevent fuel from entering the chamber and activating the shut off sensor on the nozzle when the tank is partially filled. When the tank is substantially full, fuel can flow through a drain opening near the top of the chamber to fill it and activate the nozzle shut off sensor. When the nozzle is withdrawn from the tank, the seal retracts to a location near the top of the tank, to permit substantially complete filling, or "topping out" of a more than half-full tank.

12 Claims, 6 Drawing Figures

U.S. Patent    Nov. 25, 1980    Sheet 1 of 2    4,235,263
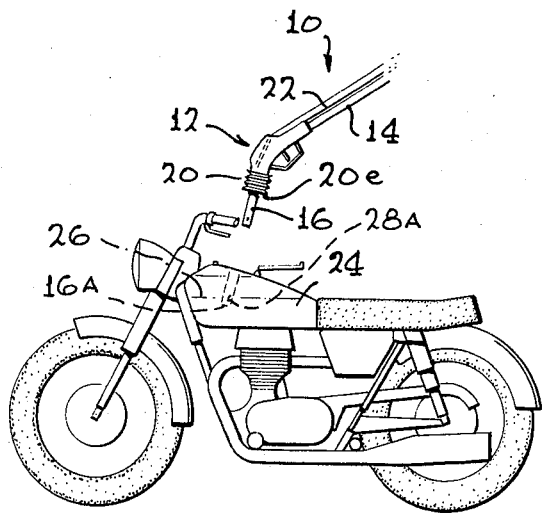
FIG. 1
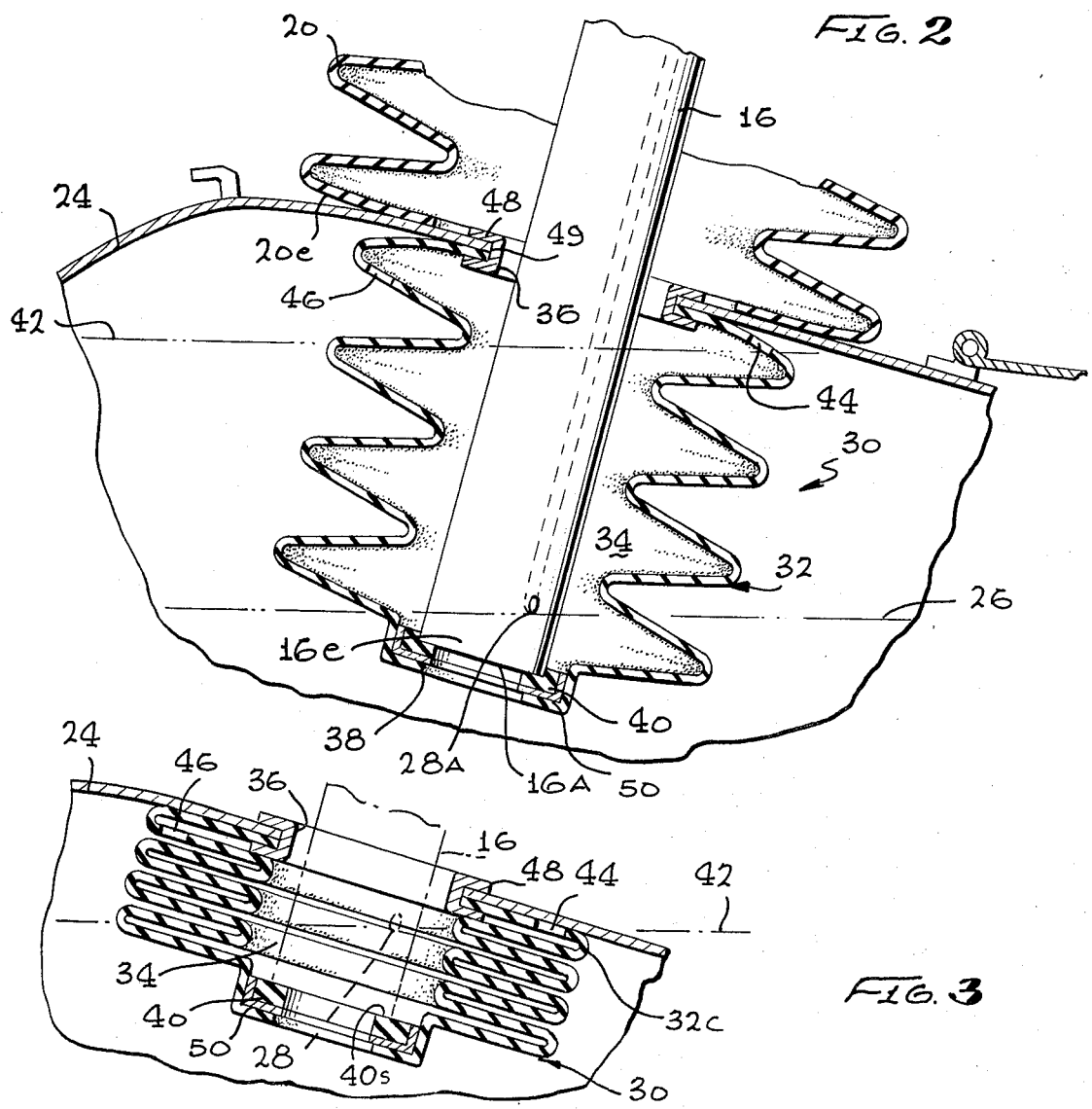
FIG. 2
FIG. 3

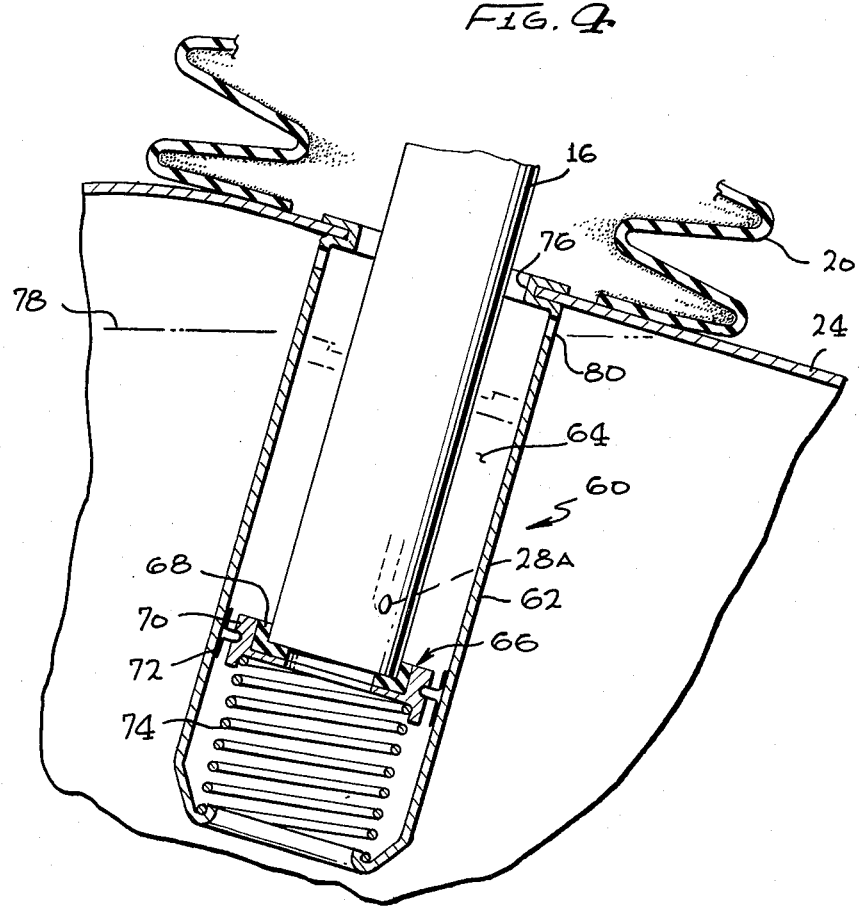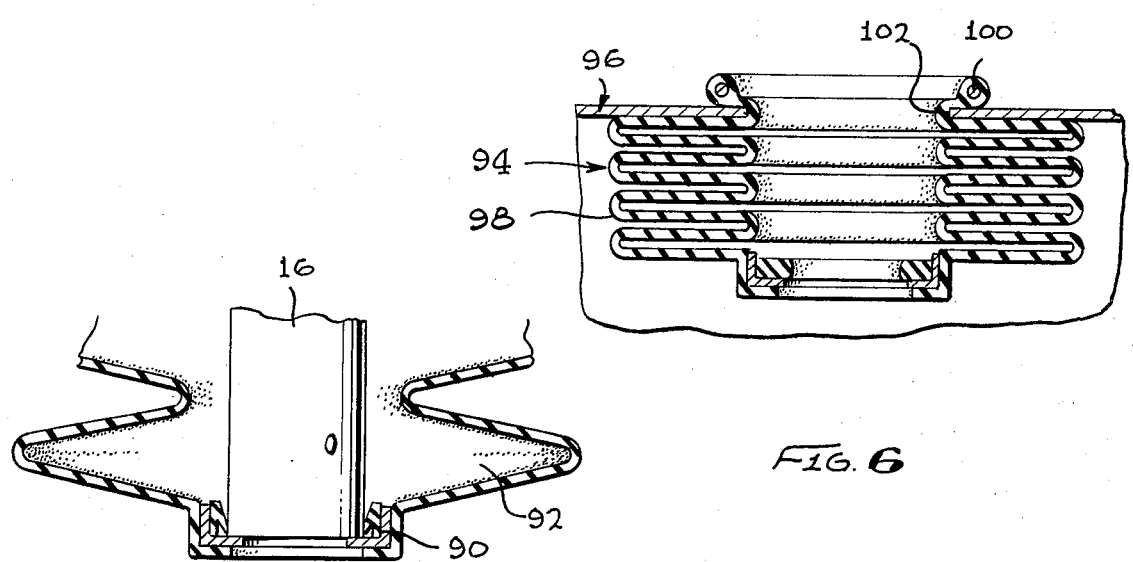

VAPOR RECOVERY FUEL TANK FILLER SYSTEM

BACKGROUND OF THE INVENTION

Gasoline vapors that are released during the dispensing of fuel into the tanks of automobiles and other vehicles, constitute an important source of air pollution. A vapor recovery system which has been recently adopted in at least one state of the United States, includes a fuel dispensing head with a bellows surrounding the fuel-dispensing nozzle. When filling a fuel tank, the operator inserts the protruding end of the nozzle into the tank, and presses the filler head with considerable force against the vehicle. The high force assures good sealing of the bellows end to the area around the fuel tank opening, to permit the effective withdrawal of vapors by a pump connected to the inside of the bellows. The dispenser head will not operate until the nozzle has been inserted a considerable depth of several inches into the tank.

In automobiles which include an extension tube extending down to the tank, the necessity for insertion of the nozzle several inches into the extension tube does not hamper substantially complete filling of the tank. In motorcycles, wherein there is normally no long extension tube leading to the tank, the necessity for deep insertion of the nozzle to operate the dispenser, can create problems. If the nozzle is inserted several inches into the tank, then when the tank is half full the fuel level will reach the shut off sensor on the nozzle and prevent any further filling of the tank. If the operator withdraws the nozzle so that only its tip lies in the tank, which is the technique presently used to completely fill a motocycle tank, then the vapor recovery bellows will not be compressed and the dispenser will not operate.

It is possible to provide special dispenser attachments to enable the complete filling of a motor cycle tank, but since most fuel is sold to automobile owners, it is likely that many gasoline stations will not carry such attachments. It is also possible to utilize a detachable filler extension tube which can be attached to the motorcycle tank during filling, and thereafter stored out of the way. However, where such storage of an extension tube is separate from the tank, the storage and retrieval is annoying and it is likely that the extension tube will be lost. Where the extension tube is to be stored within the tank, the need to operate a mechanism to withdraw and later store the tube can be annoying and the mechanism for achieving this can add complications. A filler device which enabled deep insertion of a nozzle into a tank, so as to operate a vapor recovery mechanism on the dispenser, but which enabled substantially complete filling of the tank, would be of considerable value, especially for use on motorcycle tanks.

SUMMARY OF THE INVENTION

In accordance with one embodiment of the present invention, a filler device is provided for use in a vapor recovery filler system, which enables the substantially complete filling of a fuel tank into which a nozzle is deeply received. The filler device includes walls forming a chamber within the tank, which has an upper nozzle-receiving opening, a lower exit opening through which fuel can flow into the tank, and a drain opening near the upper end of the chamber. A nozzle seal in the chamber seals to the end of a nozzle, so that fuel can be pumped into the tank to fill it, without filling the chamber with fuel. When the tank becomes substantially full, fuel flows through the drain opening into the chamber to begin filling it, until the chamber is sufficiently full to activate the shut off sensor on the nozzle, to prevent overfilling.

The nozzle seal can be mounted to be pushed down into the tank by a nozzle that engages the seal and that is pushed into the tank. As a result, even if the tank is filled to a majority of its capacity but is not substantially full, the chamber will not contain considerable fuel when the nozzle is fully inserted, so that additional fuel can be added. In one filler device, the chamber is formed by a bellows which tends to assume a compressed configuration when not forced to expand, so that the lower end of the bellows can hold the seal near the top of the tank. In another filler device, the chamber is formed by a rigid tube and the seal slides along the tube and is sealed to the inside of the tube. A spring urges the seal toward the upper end of the tube, but the spring is compressed when the nozzle is fully inserted into the tank.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded side elevation view of a vapor recovery fuel tank filler system constructed in accordance with the present invention, showing how a dispenser head is utilized in conjunction with a motor cycle fuel tank.

FIG. 2 is a sectional side view of the system of FIG. 1, with the dispenser head in a fully inserted position in the fuel tank.

FIG. 3 is a view of the filler device of FIG. 2, shown in a configuration that is assumed after the dispenser nozzle has been withdrawn therefrom.

FIG. 4 is a sectional view of a filler system constructed in accordance with another embodiment of the invention.

FIG. 5 is a partial sectional view of a filler system constructed in accordance with another embodiment of the invention.

FIG. 6 is a sectional view of a filler system constructed in accordance with another embodiment of the invention.

DESCRIPTION OF THE PREFERRED EMBODIMENTS

FIG. 1 illustrates a vapor recovery system which includes a dispenser 10 having a dispenser head 12 that receives pumped gasoline through a hose 14 and delivers it into the fuel tanks of vehicles through a dispenser nozzle 16. In order to avoid air pollution by gasoline vapors, the dispenser head includes a vapor seal formed by a compressible bellows 20 that surrounds the nozzle 16 to prevent the escape of vapors, and a vapor hose 22 connected to a vacuum pump (not shown) which draws away gasoline vapors from the region within the bellows 20. The dispenser head 12 includes a mechanism (not shown) which prevents the dispensing of fuel through the nozzle 16, until the bellows 20 has been compressed considerably, as by a force of perhaps thirty pounds. Such compression insures that the end 20e of the bellows is tightly sealed around the outer wall of the gas tank of a vehicle, to assure efficient operation of the vapor recovery apparatus. This type of dispenser head has been proposed by the state of California to assure effective vapor recovery.

The dispenser head 12 can be readily utilized to fill the fuel tanks of automobiles, which typically utilize a long extension tube extending down to the main tank portion of the vehicle. However, the dispenser head cannot be readily utilized with the fuel tanks of typical motorcycles. This is because the nozzle 16 must be inserted deeply into the motorcycle tank 24, as to the position shown at 16A, in order to compress the bellows 20 against the outside of the tank to enable operation of the dispenser head. With the nozzle at the position 16A, the fuel tank can be filled only to the level indicated at 26, wherein the fuel has risen high enough to reach the shut off sensor hole at 28A, which causes the dispenser to automatically shut off. With fuel at the level 26, the fuel tank is only slightly more than half full, and no further fuel can be dispensed into the tank.

In fuel dispensers that do not have a vapor recovery bellows, the motorcycle tank can be substantially completely filled by withdrawing the nozzle so only its tip lies in the fuel tank. However, if this procedure is followed with the vapor recovery head 12, any withdrawal of the nozzle 16 will release the vapor recovery bellows 20 and activate the mechanism that prevents any further dispensing of fuel when the bellows 20 is released. It would be possible to add an extension pipe to extend above the fuel tank 24 to receive the nozzle 16, but such an extension cannot be allowed to remain on the motorcycle, since it represents a danger to the rider. If such an extension is provided and it must be removed after use, the necessity for removal and storage can become a source of annoyance. If an extension is provided which must be stored within the tank 24, then the mechanism for storing and enabling later withdrawal and locking in the withdrawed positioned, can add complication, while the need to operate the device can become annoying.

In accordance with the present invention, a filler device, such as that shown at 30 in FIG. 2 is provided, which enables the substantially complete filling of the tank 24, without the need for an operator to activate a mechanism or attach a filler extension or other member. The filler device 30 includes a chamber fellows 32 which forms a chamber 34 that can lie a plurality of inches below the top of the fuel tank 24, but which provides a region from which fuel can be excluded. The chamber 34 includes a nozzle-receiving opening 36 near its upper end for receiving the nozzle, and an exit opening 38 near its lower end through which fuel can flow into the tank. A nozzle seal 40 is provided which can seal to the end 16e of the nozzle.

If the fuel tank 24 is initially empty, the nozzle 16 can be positioned as shown in FIG. 2, wherein it projects sufficiently through the chamber opening 16 to compress the vapor recovery bellows 20, so that the dispenser head can be operated to pass fuel through the nozzle 16 into the tank. When the fuel in the tank has reached the level indicated at 26, the fuel is at the same level as the shut off sensor at 28A. If the fuel could easily enter the chamber 34, the fuel at the sensor opening 28A would shut off the nozzle so that no more fuel could be pumped into the tank. However, the seal 40 prevents fuel from entering the chamber 34, so that the level of fuel can continue to rise in the tank to substantially completely fill it, without the fuel entering the chamber 34 and activating the sensor at 28A. When the fuel reaches the level 42 at which the tank is substantially full, the fuel can begin passing through drain openings 44, 46 formed in the bellows 32, to begin filling the chamber 34. Once the fuel rises in the chamber to the level of the sensor hole 28A, the dispenser will be turned off to prevent overfilling of the tank and spillage of the fuel. The drain openings 44, 46 also serve to permit the exit or drainage of air and gasoline vapor from the tank as it is filled with liquid fuel.

It would be possible to utilize a rigid pipe instead of the bellows 32, to substantially completely fill an empty tank, and with the nozzle seal fixed to the lower end of the pipe. However, if the tank were partially filled, to slightly above the level 26 when the nozzle was initially inserted, then no further fuel could be pumped in. This is because when the nozzle 16 were fully inserted to the position shown in FIG. 2, fuel would already be above the level of the sensor hole 28A, and the dispenser would not operate. The bellows 32, which tends to move to the collapsed condition shown at 32C in FIG. 3, when not forced to expand, permits the addition of fuel to a partially-filled tank to "top it off." Even if the fuel level in the tank of FIG. 3 is only slightly below the full level indicated at 42, it will not fill the collapsed bellows 32C. Thus, when the dispenser nozzle 16 is first installed in the chamber 34, fuel will not be above the level of the shut-off sensor at 28. As the nozzle 16 is pushed down into the tank, it seals against the seal 40, so that fuel cannot pass around the seal 40 to enter the chamber 34. Thus, when the bellows is extended to the position shown in FIG. 2, fuel will not be above the level of the sensor at 28A, even though the fuel in the tank is above the level 26. Fuel can be pumped into the tank until it reaches the level 42, when the fuel begins to drain into the chamber and activate the shut off mechanism.

The particular filler device 30 can be constructed with an elastomeric bellows having an upper end attached to the fuel tank as by a mounting ring 48 mounted in the nozzle-receiving hole 49 of the tank. Compression of the bellows can be enhanced by also using a coil spring lying around the folds of the bellows. It should be noted that it is not necessary to form a gas-tight seal between the mounting ring and the top of the bellows 32, and in fact it is possible to leave a gap between them to serve as the drain hole. The seal 40 can be formed by a soft rubber ring that can be held to the bellows by a metal mounting ring 50. The seal 40 does not have to form a gas-tight seal against the nozzle, but only seal well enough to prevent rapid filling of the chamber, so it fills considerably more slowly than the tank. The annular seal 40 which has a substantially even upper surface 40s facing the nozzle-receiving opening 36, permits sealing to the ends of nozzles of a range of diameters. In a similar way, the expandable bellows 32 enables reception of dispensing nozzles to any depth within a considerable range, that may be required to compress the vapor recovery bellows 20 sufficiently to enable operation of the dispenser head. It may be noted that a short rigid tube can be provided immediately below the mounting ring 48 to prevent excessive tilting of the nozzle 16, especially where protruding knobs are formed along the nozzle to help hold it in the tank against the force applied by the compressed vapor recovery bellows 20.

FIG. 4 illustrates another filler device 60 which enables the substantially complete filling of a motorcycle fuel tank from both an initially empty and an initially almost full condition. The device 60 includes a substantially rigid tube 62 forming a chamber 64 which can be isolated from the rest of the tank, and a sliding seal device 66 which can slide along the tube 62. The seal device 66 includes a seal member 68 such as a soft rubber annular ring, a holder 70, and an auxiliary seal member 72 which seals the outside of the holder to the inside of the tube 62. A spring 74 urges the seal or seal device 66 upwardly towards the nozzle-receiving opening 76 at the top of the chamber, but allows the seal to be resiliently moved down along the chamber.

The seal device 66 is initially pressed upward by the spring 74 as to the top of the tube, although the filler device will operate well even if the seal is initially about an inch or so below the top of the tube. When the nozzle 16 is first inserted, it seals against the seal member 68 and then moves it and the rest of the seal device 66 downwardly, as to the position shown in FIG. 4, at which the vapor recovery bellows 20 has been sufficiently compressed to enable operation of the dispenser head. Fuel then can be dispensed through the end of the nozzle to substantially completely fill the tank, until the fuel reaches the level 78. During such filling, fuel cannot rise in the chamber 64 to reach and operate the shut off sensor hole 28A. After the fuel reaches the level 78, any further fuel dispensed into the tank moves through a drain hole 80 into the chamber 64, until fuel in the chamber reaches the level of the sensor at 28A to operate it and turn off the dispenser head.

Although a ring-shaped seal is useful in providing a simple seal that can accommodate nozzles of a range of diameters, a variety of other seals can be utilized. FIG. 5 shows a seal 90 of a hinge type that can seal to the outside of the nozzle 16 to prevent the chamber 92 from initially filling with fuel.

FIG. 6 illustrates a filler device 94 which is designed to be retrofitted onto a motorcycle tank 96 that has been initially constructed without any special filler device. The device 94 includes a bellows 98 similar to that of FIG. 3, but with an upper end held by a holding ring 100. The device 94 can be installed through a hole 102 in the tank by stuffing the bellows 98 through the hole 102, until the top of the device, which is held by the ring 100, lies against the top of the tank.

Thus, the invention provides a filler device for use in a vapor recovery fuel tank filler system of a type that requires deep insertion of a nozzle into the tank prior to dispensing of fuel, which enables substantially complete filling of the tank despite such deep insertion, and which is especially useful for motor cycle fuel tanks. The filler device includes walls forming a chamber within the tank, with the chamber having a nozzle-receiving opening near its upper end and an exit opening near its lower end, and with the chamber having a nozzle seal sealable to the end of a nozzle that is inserted into the chamber. This permits fuel to be dispensed through the nozzle into the fuel tank without filling the chamber until the fuel tank is substantially completely filled. At least one drain opening is provided near the upper end of the chamber for draining fuel from the tank into the chamber when the tank is substantially full, and to enable the escape or draining of air and vapor from the tank as it is filled. The nozzle seal can be movably mounted to move down into the tank along with the nozzle, to accommodate the nozzle so that the vapor seal bellows or other vapor seal means can be sufficiently compressed. The chamber can also be provided with a means for biasing the nozzle seal towards the upper end of the chamber, so that the seal is automatically positioned at a high level in the tank when the nozzle is first inserted. This enables the nozzle to seal against the seal device prior to full insertion of the nozzle, to permit "topping out" of a largely full tank. In one device the chamber walls are formed by a bellows that can expand and contract, and with the seal mounted near the lower end of the expanded bellows. In another device, a seal device slidably moves along a substantaily rigid tube, and is upwardly biased by a spring.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. In a fuel tank filler system for receiving the nozzle of a vapor recovery fuel dispenser head deeply enough to enable operation of the dispenser head to fill a tank, the improvement comprising:
    walls forming a chamber lying within the tank which has a nozzle-receiving opening near the upper end of the chamber, an exit opening near the lower end of the chamber through which fuel can flow into the tank, and a liquid-passing drain opening near the upper end of the chamber which is positioned to allow the flow of fuel from the tank, when the tank is substantially full, into the chamber;
    said chamber having nozzle seal means sealable to the end of a dispenser head nozzle inserted into said chamber, for permitting fuel which is flowing through the nozzle to flow through said exit opening into said tank while preventing the flow of fuel directly from said nozzle into said chamber, whereby to avoid filling said chamber until the tank is sufficiently full to permit the flow of fuel from the tank through said drain opening into the chamber.

2. The improvement described in claim 1 wherein:
    said walls forming said chamber includes means for moveably supporting said seal means in movement down into the tank with the end of the nozzle while maintaining said seal means in sealing engagement with the nozzle, whereby to enable topping off of a partially filled tank.

3. The improvement described in claim 1 wherein:
    said chamber walls include a bellows which has upper and lower ends and which is constructed to enable said upper and lower ends to move away and towards each other, means connecting said upper bellows end to the tank, and means for connecting the lower bellows end to said nozzle seal means so that as the bellows expands and contracts the nozzle seal means moves respectively down and up in the tank.

4. The improvement described in claim 1 wherein:
    said chamber includes a pipe with an upper end and said nozzle seal means is slidable along said pipe and sealed to the inside thereof when slid to a position away from said upper end of said pipe, and including a spring urging said seal means towards the upper end of the pipe.

5. The improvement described in claim 1 wherein:
    said nozzle seal includes an annular member formed of elastomeric material and having a substantially even upper face to seal against the extreme end of nozzles of a range of diameters.

6. A motorcycle fuel tank and filler system comprising:
- a fuel tank with a nozzle-receiving hole;
- walls forming a chamber within the tank, said chamber having an upper end forming a nozzle-receiving opening in alignment with the tank hole, a lower chamber end forming an exit opening through which fuel can flow into the tank, and a drain opening near the upper end of the chamber for draining fuel from the tank into the chamber when the tank is substantially full;
- said chamber having a nozzle seal mounted to the lower chamber end and sealable to the end of a nozzle inserted into the chamber for permitting fuel which is flowing through the nozzle to flow into said tank while preventing the flow of fuel directly from said nozzle into said chamber, said nozzle seal being movable down into the tank with the nozzle and sealable to the nozzle before the nozzle is fully inserted and after it is fully inserted, and said nozzle seal being biased towards the upper end of the chamber to move towards it when the nozzle is retracted.

7. The system described in claim 6 wherein:
said nozzle seal comprises an elastic ring-shaped member for bearing against the extreme tip of a dispenser nozzle.

8. A fuel tank filler device for enabling the deep reception of the nozzle of a fuel dispenser head, in a tank which has a nozzle-receiving hole, to permit compression of a vapor seal located on the fuel dispenser head against a portion of the tank which surrounds the nozzle-receiving hole, comprising:
- a bellows having a first end with a nozzle-passing hole therein, said bellows having means at said first end which is mountable to the tank so that the hole in said bellows first end can lie in alignment with the nozzle-receiving hole in said tank, and said bellows having a lower second end with an exit opening, said bellows being expandable and contractable to move said first and second ends away and towards each other; and
- nozzle seal means mounted on said second end of said bellows for sealing said second end of said bellows to the end of a nozzle for permitting fuel which is flowing through the nozzle into said tank while preventing the flow of fuel directly from said nozzle into said bellows, said bellows being expandable to lower the nozzle seal means into the tank when the nozzle is inserted deeply therein, and said bellows being contractable to raise the nozzle seal means when the nozzle is withdrawn.

9. A fuel tank filler device for enabling the deep reception of the nozzle of a fuel dispenser head to permit compression of a vapor seal located on the fuel dispenser head against the tank wall portion which surrounds the nozzle-receiving hole in the tank, comprising:
- a pipe having a first end mountable to the tank to lie in alignment with the hole therein, and a lower second end;
- a seal device which includes a nozzle seal member sealable to the end of a nozzle for permitting fuel which is flowing through the nozzle to flow into said tank while preventing the flow of fuel directly from said nozzle into said pipe, said seal device being slidable along said pipe and in sealable engagement with it during such sliding; and
- spring means coupled to said seal device for urging it to slide toward the first end of the pipe.

10. A method for substantially completely filling a fuel tank by a vapor recovery dispenser which requires the deep insertion of a nozzle into the tank, but wherein the nozzle carries a sensor that shuts off the dispenser before fuel rises more than a predetermined small distance above the extreme end of the nozzle, comprising:
- sealing the area immediately around the tank-inserted nozzle from the rest of the tank when the nozzle tip lies within the tank, while coupling the extreme end of the nozzle to the tank to allow fuel to fill the tank without rising immediately around the nozzle; and
- flowing fuel from the tank into said area, during filling of the tank when it is substantially completely filled.

11. In a fuel tank filler system which includes a fuel tank with a tank opening for receiving the nozzle of a fuel dispenser head, the improvement comprising:
- a bellows having upper and lower ends, said bellows being expandable and contractable to move said ends away from and towards one another, said upper bellows end having a hole therein to receive the nozzle of a fuel dispenser head and said lower bellows end having a hole therein to pass fuel therethrough; and
- an annular seal mounted on the lower end of said bellows and extending around the center of said hole in said lower end of said bellows, to seal against the end of the nozzle of a fuel dispenser head which is inserted into said bellows through the hole in the upper end of the bellows;
- said upper end of said bellows being mounted on said tank with the hole in the upper end of said bellows in alignment with the tank opening to permit the projection of the nozzle of a fuel dispenser head through the tank opening and through the hole in the upper end of the bellows.

12. In a fuel tank filler system which includes a fuel tank with a tank opening for receiving the nozzle of a fuel dispenser head, the improvement comprising:
- a pipe having an upper end mounted on said tank, with the upper end of the pipe in alignment with said tank opening to receive the nozzle of a fuel dispenser device which is inserted through said tank opening, said pipe also having a lower end;
- an annular seal device having a periphery slidable along the inside of said pipe in sealing engagement with the inside of said pipe, said seal device also having an annular seal member which can seal against the end of a fuel dispenser nozzle; and
- a spring having one end coupled to said seal device and another end supported against movement relative to an end of said pipe, to urge said seal device to slide towards said upper end of said pipe.

* * * * *